United States Patent [19]

Wiemers et al.

[11] 4,409,373

[45] Oct. 11, 1983

[54] ADHESIVE COMPOSITIONS BASED UPON THERMOPLASTIC POLYAMIDES

[75] Inventors: Norbert Wiemers, Monheim, Fed. Rep. of Germany; Italo Albini, Pavia, Italy

[73] Assignee: Henkel Kommanditgesellschaft auf Aktien, Düsseldorf-Holthausen, Fed. Rep. of Germany

[21] Appl. No.: 359,168

[22] Filed: Mar. 17, 1982

[30] Foreign Application Priority Data

Mar. 21, 1981 [DE] Fed. Rep. of Germany ....... 3111206

[51] Int. Cl.³ .......................... C08L 77/08; C09J 3/16
[52] U.S. Cl. ................................. 525/432; 156/330.9; 156/331.8; 524/276; 524/279; 524/514; 524/607; 528/335; 528/339.3; 528/340
[58] Field of Search ............... 525/432; 528/340, 335, 528/339.3; 524/607, 276, 279, 514; 260/404.5 PA; 156/330.9, 331.8

[56] References Cited

U.S. PATENT DOCUMENTS

| | | | |
|---|---|---|---|
| 3,377,303 | 4/1968 | Peerman et al. | 528/339.3 |
| 3,444,026 | 5/1969 | Peerman | 528/339.3 |
| 3,449,273 | 6/1969 | Kettenring et al. | 528/339.3 |
| 3,483,237 | 12/1969 | Peerman et al. | 260/404.5 PA |
| 3,499,853 | 3/1970 | Griebsch et al. | 528/339.3 |
| 3,622,604 | 11/1971 | Drawert et al. | 260/404.5 PA |
| 3,937,752 | 2/1976 | Ueno et al. | 525/432 |
| 4,062,819 | 12/1977 | Mains et al. | 525/432 |
| 4,122,229 | 10/1978 | Mitchell et al. | 528/339.3 |
| 4,128,525 | 12/1978 | Yeakey et al. | 528/340 |
| 4,268,432 | 5/1981 | Maslen et al. | 525/432 |

*Primary Examiner*—Ronald W. Griffin
*Attorney, Agent, or Firm*—Hammond & Littell, Weissenberger and Muserlian

[57] ABSTRACT

This invention relates to adhesive composition. More particularly, this invention relates to adhesive compositions comprising polyamide (I) prepared by condensing dimeric higher fatty acids and monomeric fatty acids with polyether diamines and aliphatic or cycloaliphatic diamines and polyamide (II) prepared by condensing dimeric higher fatty acids and monomeric fatty acids with aliphatic or cycloaliphatic polyamines.

13 Claims, No Drawings

ADHESIVE COMPOSITIONS BASED UPON THERMOPLASTIC POLYAMIDES

FIELD OF THE INVENTION

This invention relates to adhesive compositions. More particularly, this invention relates to adhesive compositions based upon thermoplastic polyamides derived from polymerized fatty acid components.

BACKGROUND OF THE INVENTION

The use of thermoplastic polyamides based upon dimerized fatty acid as melt adhesives is known. See, for example, U.S. Pat. Nos. 3,377,303, 3,483,237, and 3,444,026, incorporated herein by reference. The average requirements that are set for adhesion, heat resistance, and aging resistance, particularly above room temperature, for adhesives can be met by such products. However, the known melt adhesives based upon thermoplastic polyamides are deficient with regard to the adhesion and sealing functions under changing temperatures, especially below freezing.

It is also known that the thermoplastic polyamides which contain short-chain polyether diamines in addition to the dimerized fatty acids and were prepared with the addition of short-chain diamines, retain good flexibility at temperatures below freezing. However, their bonding and sealing properties still are not entirely satisfactory at temperatures below room temperature and close to freezing. Thus, there has been a need to develop thermoplastic adhesives, particularly melt adhesives, that retain exceptional flexibility even at low temperatures and exhibit increased bonding strength at low temperatures, with particularly good values being exhibited under peeling conditions.

OBJECTS OF THE INVENTION

It is an object of the invention to provide a novel adhesive composition.

It is also an object of the invention to provide an adhesive composition based upon thermoplastic polyamides.

It is a further object of the invention to provide adhesive compositions comprised of:

(I) from about 10 to 90 percent by weight, based on the weight of the total adhesive composition, of a polyamide prepared by condensing:
  (a) from about 35 to 49.5 mol percent of dimeric higher fatty acids in combination with
  (b) from about 0.5 to 15 mol percent of $C_{12}$–$C_{22}$-monomeric fatty acids with
  (c) from about 2 to 35 mol percent of polyether diamines of the formula

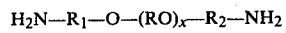

wherein x represents a number of from 8 to 80; $R_1$ and $R_2$, which may be the same or different, are each a divalent aliphatic or cycloaliphatic hydrocarbon having from 1 to 12 carbon atoms; and R represents a linear or branched aliphatic divalent hydrocarbon radical having from 1 to 6 carbon atoms, and
  (d) from about 15 to 48 mol percent of aliphatic or cycloaliphatic diamines having from 2 to 40 carbon atoms in the aliphatic or cycloaliphatic moiety, and (II) from about 90 to 10 percent by weight, based upon the weight of the total adhesive composition, of a polyamide prepared by condensing:
  (a) from about 20 to 49.5 mol percent of dimeric higher fatty acids in combination with
  (b) from about 0.5 to 15 mol percent of $C_{12}$–$C_{22}$-monomeric fatty acids with
  (c) from about 55 mol percent of at least one aliphatic or cycloaliphatic polyamine having at least 2 primary amino groups and from 2 to 40 carbon atoms in the aliphatic or cycloaliphatic moiety.

These and other objects of the invention will become more apparent in the discussion below.

DETAILED DESCRIPTION OF THE INVENTION

Applicants have developed novel adhesive compositions that overcome the deficiencies of known adhesives. Said adhesive compositions are comprised of:

(I) from about 10 to 90 percent by weight, based on the weight of the total adhesive composition, of a polyamide prepared by condensing:
  (a) from about 35 to 49.5 mol percent of dimeric higher fatty acids in combination with
  (b) from about 0.5 to 15 mol percent of $C_{12}$–$C_{22}$-monomeric fatty acids with
  (c) from about 2 to 35 mol percent of polyether diamines of the formula

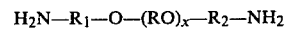

wherein x represents a number of from 8 to 80, preferably from 8 to 40; $R_1$ and $R_2$, which may be the same or different, are each a divalent aliphatic or cycloaliphatic hydrocarbon having from 1 to 12 carbon atoms; and R represents a linear or branched aliphatic divalent hydrocarbon radical having from 1 to 6 carbon atoms, and
  (d) from about 15 to 48 mol percent of aliphatic or cycloaliphatic diamines having from 2 to 40 carbon atoms in the aliphatic or cycloaliphatic moiety, and (II) from about 90 to 10 percent by weight, based upon the weight of the total adhesive composition, of a polyamide prepared by condensing:
  (a) from about 20 to 49.5 mol percent of dimeric higher fatty acids in combination with
  (b) from about 0.5 to 15 mol percent of $C_{12}$–$C_{12}$-monomeric fatty acids with
  (c) from about 55 mol percent of at least one aliphatic or cycloaliphatic polyamine having at least 2 primary amino groups and from 2 to 40 carbon atoms.

Advantageously, with regard to polyamide (I), component (a) comprises from about 35 to 49.5 mol percent of dimeric higher fatty acids, component (b) comprises from about 0.5 to 15 mol percent of monomeric fatty acids, component (c) comprises from about 4 to 10 mol percent of polyether diamines, and component (d) comprises from about 40 to 46 mol percent of aliphatic or cycloaliphatic diamines.

Modification of at least polyamide (I) with an additional from about 2 to 25 mol percent of an alkanedicarboxylic acid with from 4 to 10 carbon atoms in the molecule can have a favorable effect. The second of the polyamides to be used, polyamide (II), can also be modified with carboxylic acids (cf. U.S. Pat. Nos. 3,377,303, 3,483,237, and 3,444,026).

According to another, especially preferred embodiment, polyamide (I) is prepared by condensing:

(a) a dimerized higher fatty acid with a dimer content greater than 70 percent by weight and with (b) from about 2 to 10 percent by weight of $C_{16/18}$-fatty acid, based upon the weight of the dimerized fatty acid with (c) bis-(3-aminopropyl)-polytetrahydrofuran having a molecular weight of from 700 to 1500 and/or bis-(2-aminopropyl)-polyoxypropylene having a molecular weight of from about 1200 to 2500 as well as (d) diaminoethane, 1,3-diaminopropane, 1,4-diaminobutane, and/or dimer diamine.

The thermoplastic polyamides to be used according to the invention are based upon so-called dimerized fatty acids, which often are also called polymeric fatty acids. Suitable types are commercially available and are obtained by the polymerization of unsaturated fatty acids or esters thereof with lower alkanol. The dimer part, which should not normally exceed 50 percent by weight, predominates in most cases. It is understood that monocarboxylic acids having from 12 to 22 carbon atoms may also be present in smaller amounts. These monocarboxylic acids may be linear or branched and may contain one or more double bonds.

The polyether amines to be used are known and primarily commercially available compounds. They contain two terminal primary amino groups and one polyether chain of at least 8 units. Typical representatives of useful polyether diamines include bis-(2-aminopropyl)-polyoxypropylenes and bis-(3-aminopropyl)-polytetrahydrofurans with molecular weights of from approximately 500 to 5000. These representative compounds are preferred due to their ready availability. It is understood that polyethers with two terminal amino groups, prepared from polymeric and, optionally, branched butane diols, pentane diols, and hexane diols, are also suitable. Mixed ethers with two primary amino groups could also be used.

The polyamides (I) and (II) are each prepared with the addition of low molecular weight diamines. These include known diamines for the formation of polyamides, which have one linear or branched chain with two or more carbon atoms, such as, for example, ethylenediamine, 1,3-diaminepropane, and/or 1,4-diaminobutane, neopentyldiamine, hexamethylenediamine, and trimethylhexamethylenediamine. Also useful are diamines that were obtained from dimerized higher fatty acids and in which the carboxyl groups were reacted to amides or nitriles and then hydrogenated to amino groups. The diamines produced have the same number of carbon atoms as the dimerized fatty acids. Products of this type are frequently called dimer diamines. Examples of cycloaliphatic diamines include diaminodicyclohexylmethane and 3-aminomethyl-3,5,5-trimethylcyclohexylamine. Less preferred are aromatic and heterocyclic diamines. An example of aromatic diamines is diaminodiphenylmethane; an example of arylaliphatic amines is xylylenediamine; and examples of heterocyclic amines include piperazine, dimethylpiperazine, and dipiperidylpropane.

As mentioned above, alkanedicarboxylic acids can be included in addition to the carboxylic acids of components (a) and (b). Suitable examples of such acids include adipic acid, azelaic acid, sebacic acid, and decanedicarboxylic acid.

The polyamides prepared according to the invention are prepared in a known process, by melting condensation. Here, the acid components react with the amine components at temperatures of from about 150° to 250° C., and the water of reaction can be removed by distillation or, if necessary, by the use of an azeotropic solvent and/or under vacuum. The amine or acid number can be influenced in known manner by the proper control of the reaction and the choice of a small excess of the acid or amino function, respectively. Preferably the acid and amine number of the polyamides (I) and (II) are each in the range of from about 0.3 to 15.0.

The polyamides (II) differ from the polyamides (I) by the absence of the amine component with polyether groups. The polyamides (II) and the preparation thereof are described more fully in U.S. Pat. Nos. 3,377,303, 3,483,237, and 3,444,026. The polyamides (I) and the preparation thereof are described in co-pending, commonly assigned U.S. patent application Ser. No. 359,167, filed Mar. 17, 1982, incorporated herein by reference.

A content of wax-like polyethylene, or wax itself, in the adhesives according to the invention is useful. Such products are commercially available. Natural or synthetic waxes based upon a hydrocarbon structure, including polyolefin waxes and their derivatives and also microcrystalline waxes, are preferred. Typical, suitable representatives are the so-called polyethylene waxes with a low to medium molecular weight of approximately 1500 to 15,000. The use of mixtures of such resins is advantageous in many cases. The wax or wax-like substances can be present in amounts of from 0 to about 50 percent by weight, based upon the weight of the total adhesive composition.

As is generally the case with melt adhesives, an inviscating additive frequently must be used to adjust the tackiness to a suitable degree. Useful for this are inviscating hydrocarbon resins, synthetic resins, polyterpenes, or also resin derivatives such as dihydroabietyl alcohol or similar substances. The last-mentioned natural resins not only offer favorable inviscating properties at low temperatures, but they also facilitate the flow of the melt and thus result in an optimal wetting of the surface to be bonded. The inviscating additives can be present in amounts of from 0 to about 50 percent by weight, based upon the weight of the total adhesive composition. Preferably the combined amount of wax or wax-like substance plus inviscating agent does not exceed 50 percent by weight.

In addition to the mixing proportions mentioned above, the adhesives according to the invention can usually also contain up to 10 percent by weight of additional additives. Suitable for this purpose are, for example, antioxidants, stabilizers to impart resistance against light and heat, fillers such as barium sulfate, calcium carbonate, or titanium dioxide, or also pigments, as well as preservatives and fungicides.

The melt adhesives according to the invention generally are applied from the melt via feeding or metering equipment. The melt can be kept in supply or obtained by the melting of molded pieces such as cylinders, ropes, wires, or other profiles. Immediately after the application of the liquid adhesive film, the surfaces to be glued should be bonded together with slight pressure.

In addition, it is possible to dissolve the new adhesives in suitable solvents and apply them in this manner. It is then generally necessary to reactivate the adhesive condition by applying heat. This is especially true of the case where one of the two surfaces to be bonded is not permeable by the solvent used. Finally, it is also possible to apply the adhesive in a suitable dispersion.

The adhesives prepared according to the invention have a broad range of applications. For example, these adhesives can be used in the following manner: the casting of electrical connections or motors; the sealing of headlights; the mounting of refrigeration coils; the assembly of plastic and wooden, heat-treated surfaces in furniture manufacture; and as adhesives and sealing layers in products that are heat-adaptable, such as shrinking sleeves, and shrinking caps. These applications have one task in common, namely, the bonding of different materials, the sealing of assembly gaps, if necessary, and, after the assembly, the guarantee of durability and tightness over a wide range of temperatures, including below freezing.

The following examples are intended to illustrate the invention and should not be construed as limiting the invention thereto.

EXAMPLES

TESTING PROCEDURES

1. R+B (Softening point)

The softening point in °C. was measured with the ring and ball method (R+B) according to ASTM E-28.

2. Viscosity

The viscosity in mPa.s was measured with a Brookfield Thermocel viscometer type RVT with the spindle SC 4-27, at 160° C.

3. Tensile and Shear Strength

The determination of the tensile and shear strength was based on DIN 53 283.

| Work piece: | 1. aluminum: Al Cu Mg, plated 2 × |
| --- | --- |
| | 2. polycarbonate: colorless Makrolon ® (available from Bayer) according to DIN 7744 |
| Test piece: | 100 × 25 × 2 mm overlap 12.5 mm |
| Pre-treatment: | 1. polycarbonate: degreasing with benzene |
| | 2. aluminum: |
| | (a) degreasing with benzene, and then |
| | (b) pickling |

Twenty-five grams of sodium metasilicate (Na$_2$SiO$_3$.9H$_2$O) are dissolved in 100 ml of distilled water, and 2.5 gm of adduct of 6 EO onto nonylphenyl are added to the solution. The solution is heated to 70° C., 25 mm of the aluminum surfaces are dipped in the cleaning solution for five minutes, and then the metal sheets are thoroughly rinsed off with distilled water and dried.

(a) Bonding of Aluminum

The adhesive is applied to one of the cleaned aluminum sheets in a level layer. A second, cleaned and pretreated sheet is placed upon it with an overlap of from 12.5 to 14.5 mm and then placed in a heating cabinet for 20 minutes at 200° C. and under a pressure of 35×10$^{-3}$ N/mm$^2$.

(b) Bonding of Polycarbonate

Both overlap surfaces are covered with a layer of adhesive and bonded directly.

Conditioning: 24 hours at 20° C. Testing: 20° C. or 0° C., 500 mm peeling rate.

4. Peeling Resistance

The peeling resistance was determined by the T-peel test.

| Work piece: | polyethylene foil (Baylon V 22 E 464) |
| --- | --- |
| Test piece: | 120 × 25 × 0.2 mm overlap 80 mm |
| Pre-treatment: | corona treatment |
| Bonding: | overlap surface is covered on one side with a layer of adhesive and bonded directly |
| Condition: | 24 hours at 20° C. |

5. Mandrel Test

A film with the dimensions of 200×25.4×1 mm is bent 180° C. around a mandrel with a diameter of 25.4 mm. Mandrel and test strip are conditioned at the test temperature for four hours. Ten test pieces each were tested.

PREPARATION OF ADHESIVE COMPOSITIONS

First, thermoplastic polyamides were prepared by a known method for the production of the melt adhesives. The amounts of the fatty acids and amines used and the resulting amine and acid numbers are set forth in the following table:

TABLE 1

| Polyamide: | A | B | C | D |
| --- | --- | --- | --- | --- |
| Polymeric fatty acid (mono 1%; dim. 95%, trim. 4%) ("FS I") (gm) | 265.0 | 265.0 | — | 285.0 |
| Polymeric fatty acid (mono 3%; dim. 75%, trim. 22%) ("FS II") (gm) | — | — | 265.0 | — |
| Stearic acid (gm) | 28.5 | 19.9 | 19.9 | — |
| Diaminoethane (gm) | 28.9 | 27.7 | 27.0 | 27.6 |
| Bis-(3-aminopropyl)-polytetrahydrofuran (MW 750) (gm) | — | — | 37.5 | — |
| Bis-(3-aminopropyl)-polytetrahydrofuran (MW 1100) (gm) | 42.9 | 41.2 | — | — |
| Bis-(2-aminopropyl)-polypropylene oxide (MW 2000) (gm) | — | — | — | 120.0 |
| Amine number | 5.5 | 1.0 | 0.7 | 2.9 |
| Acid number | 1.4 | 7.6 | 9.8 | 1.4 |

A commercial, dimerized fatty acid (2% monomer, 93% dimer, the rest portions of higher polymers) was used as base for two polyamides of type (II) described above. The following were used per 100 parts by weight of this acid: 8.3 parts by weight of diaminoethane and 25.7 parts by weight of dimer diamine (Polyamide E) or 28 parts by weight of azelaic acid, 5.3 parts by weight of diaminoethane, and 21 parts by weight of piperazine (Polyamide F).

Adhesive compositions were prepared by melting together, with intense agitation, the Polyamides A to D and the Polyamides E and F, as well as wax-like, commercially available polyethylene (softening point 106° C.) and dihydroabietyl alcohol. The amounts of the components in parts by weight and the results of testing of the adhesive compositions prepared are set forth in the following table:

TABLE 2

| Example No.: | 1 | 2 | 3 | 4 |
| --- | --- | --- | --- | --- |
| Polyamide A | 17 | — | — | — |
| Polyamide B | — | 17 | — | — |
| Polyamide C | — | — | 17 | — |
| Polyamide D | — | — | — | 17 |

TABLE 2-continued

| Example No.: | 1 | 2 | 3 | 4 |
|---|---|---|---|---|
| Polyamide E | 30 | 30 | 30 | 30 |
| Polyamide F | 15 | 15 | 15 | 15 |
| Polyethylene | 15 | 15 | 15 | 15 |
| Dihydroabietyl alcohol | 25 | 25 | 25 | 25 |
| Viscosity (mPa · s at 160° C.) | 10,700 | 16,500 | 17,100 | 15,300 |
| Softening point (°C.) | 95 | 97 | 98 | 93 |
| Mandrel Test (50% rupture, in °C.) | −37.5 | −37.5 | −37.5 | −42.5 |
| Tensile and shear strength (Al/Al, in N/mm²) | 4.3 | 5.4 | 5.6 | 5.8 |

Comparison Examples A and B

When the polyamides in Table 1, i.e., Polyamides A to D, were replaced by 17 gms of a polyamide that was the condensation product of 256.5 gm of FS II, 28.5 gm of stearic acid, 21.7 gm of diaminoethane, and 30.5 gm of 1,13-diaminotrioxa-(4,7,10)-tridecane (amine number 3.2; acid number 5.2), the mandrel test resulted in only −25° C., while the tensile and shear strength was at 4.7 N/mm². When only Polyamides E and F were used in amounts of 30 gm and 15 gm, respectively, instead of Polyamides A to D, the other components of the formulation being kept constant, the values were as follows: mandrel test, −15° C.; tensile and shear strength, 3.2 N/mm².

The following polyamides were also prepared from the indicated components:

| Polyamides G and H | | |
|---|---|---|
| Component | G | H |
| Dimerized fatty acid (FS I) (gm) | 285.0 | 285.0 |
| Diaminoethane (gm) | 21.1 | 21.1 |
| Dimerized fatty acid diamine (prepared via amide and hydrogenation) (gm) | 57.8 | 57.8 |
| Bis-(3-aminopropyl)-polytetrahydrofuran (MW 750) (gm) | 56.2 | — |
| Bis-(2-aminopropyl)-polypropylene oxide (MW 2000) (gm) | — | 150.0 |

Polyamides G and H had amine numbers of 5.5 and 2.1, respectively, and each had an acid number of 1.2.

Polyamides G and H were used to prepare adhesive compositions, the composition of which and characteristics of which are set forth in the following table:

TABLE 3

| Example No.: | 5 | 6 | 7 | 8 | 9 | 10 |
|---|---|---|---|---|---|---|
| Polyamide G (gm) | 47 | 52 | 57 | 42 | 52 | — |
| Polyamide H (gm) | — | — | — | — | — | 47 |
| Polyamide F (gm) | 15 | 15 | 15 | 15 | 15 | 15 |
| Polyethylene (gm) | 15 | 15 | 15 | 20 | 10 | 15 |
| Dihydroabietyl alcohol (gm) | 23 | 18 | 13 | 23 | 23 | 23 |
| Viscosity (mPa · s, at 160° C.) | 16,500 | 22,000 | 29,000 | 36,000 | 11,200 | 17,200 |
| Softening point (°C.) | 90 | 95 | 96 | 101 | 84 | 91 |
| Mandrel test (°C.) | −37.5 | −35.0 | −32.5 | −35.0 | −30.0 | −40.0 |
| Peeling resistance (N/25 mm) | | | | | | |
| PE at 20° C. | 34.0 | 38.3 | 36.7 | 21.8 | 47.9 | 38.5 |
| at 0° C. | 19.8 | 15.8 | 16.4 | 13.0 | 28.8 | 20.1 |

TABLE 3-continued

| Example No.: | 5 | 6 | 7 | 8 | 9 | 10 |
|---|---|---|---|---|---|---|
| PC/PC | | | | | | |
| at 20° C. | 1.4 | 1.7 | 1.4 | 1.6 | 1.9 | 1.5 |
| at 0° C. | 2.3 | 2.4 | 2.8 | 1.8 | 2.6 | 2.6 |
| Al/Al | | | | | | |
| at 20° C. | 3.4 | 4.2 | 4.2 | 3.1 | 4.4 | 3.5 |
| at 0° C. | 9.1 | 11.2 | 11.3 | 9.4 | 9.9 | 10.2 |

Comparison Examples C and D

The following were mixed to prepare a melt adhesive:

| Component | Amount (gm) |
|---|---|
| Comparison Example C: | |
| Polyamide E | 47 |
| Polyamide F | 15 |
| Polyethylene | 15 |
| Dihydroabietyl alcohol | 23 |
| Comparison Example D: | |
| Polyamide E | 37 |
| Polyamide F | 25 |
| Polyethylene | 15 |
| Dihydroabietyl alcohol | 23 |

The adhesives prepared were tested, and the results are set forth in the following table:

TABLE 4

| Comparison Example No.: | C | D |
|---|---|---|
| Mandrel test (°C.) | −27.5 | −28.0 |
| Peeling resistance (N/25 mm) | | |
| PE/PE at 20° C. | 20.6 | 18.2 |
| at 0° C. | 5.6 | 5.5 |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A hot melt adhesive composition based upon thermoplastic polymerized fatty acid components which comprises:
   (I) from about 10 to 90 percent by weight, based on the weight of the total adhesive composition, of a polyamide prepared by condensing:
      (a) from about 35 to 49.5 mol percent of dimeric higher fatty acids in combination with
      (b) from about 0.5 to 15 mol percent of $C_{12}$–$C_{22}$-monomeric fatty acids with
      (c) from about 2 to 35 mol percent of polyether diamines of the formula $H_2N$—$R_1$—$O$—$(RO)_x$—$R_2$—$NH_2$

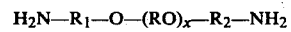

wherein x represents a number of from 8 to 80; $R_1$ and $R_2$, which may be the same or different, are each a divalent aliphatic or cycloaliphatic hydrocarbon having from 1 to 12 carbon atoms; and R represents a linear or branched aliphatic divalent hydrocarbon radical having from 1 to 6 carbon atoms, and
      (d) from about 15 to 48 mol percent of aliphatic or cycloaliphatic diamines having from 2 to 40 carbon atoms in the aliphatic or cycloaliphatic moiety, and (II) from about 90 to 10 percent by weight, based upon the weight of the total adhesive composition, of a polyamide prepared by condensing:
  (a) from about 20 to 49.5 mol percent of dimeric higher fatty acids in combination with
  (b) from about 0.5 to 15 mol percent of $C_{12}$–$C_{22}$-monomeric fatty acids with
  (c) from 55 mol percent of at least one aliphatic or cycloaliphatic polyamine having at least 2 primary amino groups and from 2 to 40 carbon atoms.

2. The adhesive composition of claim 1, wherein x represents a number of from 8 to 40.

3. The adhesive composition of claim 1, wherein polyamide (I) was prepared by condensing:
  (a) from about 35 to 49.5 mol percent of dimeric higher fatty acids in combination with
  (b) from about 0.5 to 15 mol percent of $C_{12}$–$C_{22}$-monomeric fatty acids with
  (c) from about 4 to 10 mol percent of the polyether diamines and
  (d) from about 40 to 46 mol percent of aliphatic or cycloaliphatic diamines.

4. The adhesive composition of claim 1, wherein either or both of the polyamides were prepared by also condensing from about 2 to 25 mol percent of an alkanedicarboxylic acid with from 4 to 10 carbon atoms in the molecule.

5. The adhesive composition of claim 1, wherein polyamide (I) is prepared by condensing:
  (a) a dimerized higher fatty acid with a dimer content greater than 70 percent by weight and with
  (b) from about 2 to 10 percent by weight of $C_{16/18}$-fatty acid, based upon the weight of the dimerized fatty acid,
  (c) bis-(3-aminopropyl)-polytetrahydrofuran having a molecular weight of from 700 to 1500 and/or bis-(2-aminopropyl)-polyoxypropylene having a molecular weight of from about 1200 to 2500 as well as
  (d) diaminoethane, 1,3-diaminopropane, 1,4-diaminobutane, and/or dimer diamine.

6. The adhesive composition of claim 1 which also comprises conventional additives selected from the group consisting of polyethylene, waxes, inviscating resins, fillers, pigments, stabilizers, and mixtures thereof.

7. The adhesive composition of claim 6, wherein (i) polyethylene or a wax or (ii) an inviscating resin is present in an amount of from 0 to about 50 percent by weight, based upon the weight of the total adhesive composition.

8. The adhesive composition of claim 6, wherein a filler, pigment, or stabilizer is present in an amount of from 0 to about 10 percent by weight, based upon the weight of the total adhesive composition.

9. A method of adhering two surfaces together which comprises applying to at least one of said surfaces an effectively adhesive amount of an adhesive composition of claim 1.

10. The method of claim 9, wherein the adhesive composition comprises solvent or is activated by solvent.

11. The method of claim 9, wherein the adhesive composition is used as a dispersion in an aqueous medium.

12. A method of coating an object which comprises applying thereon an effective amount of the adhesive composition of claim 1.

13. A method of sealing which comprises applying an effectively sealing amount of an adhesive composition of claim 1 to an area to be sealed.

* * * * *